(12) United States Patent
Aanensen

(10) Patent No.: US 11,719,839 B2
(45) Date of Patent: Aug. 8, 2023

(54) METHOD FOR CORRECTION OF CLOCK DRIFT IN SEISMIC NODES, A SEISMIC NODE AND A SEISMIC NODE HANDLING SYSTEM

(71) Applicant: inApril AS, Lillestrøm (NO)

(72) Inventor: Oistein Aanensen, Melhus (NO)

(73) Assignee: INAPRIL AS, Lillestrøm (NO)

(*) Notice: Subject to any disclaimer, the term of this patent is extended or adjusted under 35 U.S.C. 154(b) by 408 days.

(21) Appl. No.: 16/977,193

(22) PCT Filed: Mar. 1, 2019

(86) PCT No.: PCT/NO2019/050047
§ 371 (c)(1),
(2) Date: Sep. 1, 2020

(87) PCT Pub. No.: WO2019/168411
PCT Pub. Date: Sep. 6, 2019

(65) Prior Publication Data
US 2021/0041586 A1    Feb. 11, 2021

(30) Foreign Application Priority Data

Mar. 2, 2018 (NO) .................................. 20180319

(51) Int. Cl.
  *G01V 1/26* (2006.01)
  *G01V 1/24* (2006.01)
  *G01V 1/22* (2006.01)
(52) U.S. Cl.
  CPC ............. *G01V 1/247* (2013.01); *G01V 1/26* (2013.01); *G01V 1/226* (2013.01); *G01V 2200/12* (2013.01)

(58) Field of Classification Search
  CPC ....... G01V 1/247; G01V 1/26; G01V 2200/12
  See application file for complete search history.

(56) References Cited

U.S. PATENT DOCUMENTS 7,388,541 B1    6/2008    Yang
2009/0143990 A1  6/2009   Kamata

FOREIGN PATENT DOCUMENTS

| EP | 2 071 361 | 6/2009 |
| EP | 2 525 240 | 11/2012 |
| NO | 20160971 | 10/2017 |

(Continued)

OTHER PUBLICATIONS

Olofsson, Bjorn, et al, "Ensuring Correct Clock Timing in Ocean Bottom Node Acquisition." Paper presented at the 2010 SEG Annual Meeting, Denver, Colorado, Oct. 2010 (Year: 2010).*

(Continued)

*Primary Examiner* — Ian J Lobo
(74) *Attorney, Agent, or Firm* — Wenderoth, Lind & Ponack, L.L.P.

(57) ABSTRACT

A method of correcting clock drift in at least one slave clock in a seismic node. The method comprises obtaining a number of clock drift measurements of the at least one slave clock in the at least one seismic node. A clock drift correction function as a function of time is calculated by curve fitting the number of clock drift measurements to a 2nd order polynomial. A time of reference of the recorded seismic sensor data is corrected by the 2nd order polynomial clock drift correction function.

16 Claims, 8 Drawing Sheets

(56) References Cited

FOREIGN PATENT DOCUMENTS

WO    2008/070754    6/2008
WO    2017/213512    12/2017

OTHER PUBLICATIONS

International Search Report dated Jun. 7, 2019 in corresponding International Application No. PCT/NO2019/050047.
International Preliminary Report on Patentability dated May 12, 2020 in corresponding International Application No. PCT/NO2019/050047.
Norwegian Search Report dated Sep. 12, 2018 in corresponding Norwegian Application No. 20180319.
F. Vernotte et al., "Uncertainties of drift coefficients and extrapolation errors: Application to clock error prediction", Metrologia, 2001, vol. 38, No. 4, pp. 325-342.

* cited by examiner

METHOD FOR CORRECTION OF CLOCK DRIFT IN SEISMIC NODES, A SEISMIC NODE AND A SEISMIC NODE HANDLING SYSTEM

INTRODUCTION

The invention concerns correction of clock drift in seismic nodes, and in particular concerns a method for correction of clock drift in seismic nodes, a seismic node and a seismic node handling system.

BACKGROUND

Seismic surveying may be performed using a number of different solutions. Example solutions are e.g. seismic streamer cables towed behind a vessel, ocean bottom seismic cables, or autonomous seismic recorders/nodes arranged on the ocean bottom. The autonomous seismic recorders may be individually placed on the ocean bottom by e.g. remotely operated vehicles (ROV), by dropping the autonomous seismic recorders into the sea from a vessel, or alternatively the autonomous seismic nodes may be arranged on the ocean bottom attached to a cable deployed from the vessel. The cable may be a rope or a wire. The autonomous seismic nodes may be recovered attached to the cable, picked up by an ROV or picked up from the sea after floating to the surface.

Autonomous seismic nodes are independent seismic recorders that are able to operate on their own while on the sea floor. Autonomous seismic nodes typically comprises one or more compartments containing sensors (geophones or accelerometers and hydrophones), a data recording device and a power source. Autonomous seismic nodes are thus self-contained and do not need to be connected to anything nor communicate with anything when positioned on the sea floor. When hereafter referring to seismic nodes, these are autonomous seismic nodes as explained above.

Each seismic node contains a slave clock providing a reference time for the various sensor data recorded by the node. Before placement on the seabed the slave clock in each seismic node is calibrated and synchronized with a master clock on the vessel for the same absolute time reference. The slave clocks in the nodes are subject to drift during the time the seismic nodes spend on the seabed. This drift is often referred to as a combination of an ageing effect and other effects coming from temperature change etc. A typical drift for a slave clock in a seismic node may be around 0.5-5 milliseconds per 100 days, but may also be higher than 5 milliseconds.

The clock drift of the slave clock while on the seabed is typically measured when the nodes are onboard the vessel again, but clock drift may also be measured while on seabed from an ROV using some kind of connector, optical communication or other forms of wireless communication. After retrieval of the seismic nodes from the seabed, the slave clock in each seismic node is therefore again compared with the vessel master clock and a clock drift, $\Delta t$, of each slave clock is measured and recorded. The clock drift is the deviation from the master clock.

Before processing, the time reference of recorded data in each node is corrected for measured clock drift ($\Delta t$). The correction for this assumed clock drift can be done and applied to the seismic data in the node, onboard the vessel or later during processing to ensure that all the seismic data recorded by all the seismic nodes are assigned as near as possible to the same correct time of reference which by definition is the vessel master clock. The correction for clock drift is also used for timing reference in other integrated systems such as navigation computers etc. The systems today synchronize the slave clock(s) in each node before deployment and measures the clock drift in the slave clock(s) in each node after retrieval. These two measurements are then used for correction of the time of reference of the recorded sensor data in that node. The two measurements typically assumes and provide a linear correction function for the clock drift.

SUMMARY OF THE INVENTION

The present invention provides a method for correction of clock drift in at least one slave clock in a seismic node. The method comprises performing a number of clock drift measurements of the at least one slave clock in the seismic node. A clock drift correction function of the at least one seismic node slave clock is calculated by curve fitting the number of clock drift measurements to a $2^{nd}$ order polynomial.

The clock drift measurements are performed both before deployment and after retrieval of the seismic node.

The invention provides a method for correcting for clock drift of at least one slave clock in at least one seismic node after a seismic recording by the at least one seismic node resulting in data sets of recorded seismic sensor data as a function of time. The method comprising obtaining a number of clock drift measurements of the at least one seismic node slave clock, and calculating a clock drift correction function of the at least one seismic node slave clock by curve fitting the number of clock drift measurements to a $2^{nd}$ order polynomial.

A number of clock drift measurements may include obtaining at least one clock drift measurement of the at least one slave clock before recording of seismic sensor data by the seismic node. The at least one clock drift measurement may comprise synchronizing the at least one slave clock with a master clock. The at least one clock drift measurement may include obtaining a first set of clock drift measurements of the at least one slave clock during a first time-period. Obtaining a number of clock drift measurements may further comprise obtaining a second set of clock drift measurements of the at least one slave clock during a time-period after recording of seismic sensor data by the seismic node. The number of clock drift measurements may be obtained when the seismic node is in a storage position in a seismic node storage system. The number of clock drift measurements may be obtained when the seismic node is in an intermediate measurement position in a seismic node handling system. The method may further comprise correcting a time of reference of the recorded seismic sensor data by the $2^{nd}$ order polynomial clock drift correction function. Correcting the time of reference of the recorded seismic sensor data in the seismic node may be done before or during downloading of the recorded seismic sensor data from the seismic node and to a central computer. The method may be performed in the at least one seismic node. The method may be performed by a clock drift measurement device.

The invention also provides a seismic node comprising a slave clock, and where the seismic node is configured for performing the method above. The seismic node may further be configured for receiving a master clock signal and obtaining a clock drift between the slave clock and the master clock signal.

The invention also provides a handling system for seismic nodes, the handling system comprising a master clock, wherein the handling system is configured for performing the method above. A clock drift between a slave clock in a seismic node and the master clock may be obtained by a clock drift measurement internally in each seismic node.

The invention also provides a computer program for performing the method above.

The synchronization and clock drift measurements are performed while the seismic nodes are connected to a master clock or measuring device before deployment of the seismic nodes and again connected to the master clock or the measuring device after retrieving the seismic node from the seabed. The seismic nodes may be connected to the master clock or the measuring device in a separate location before docking the seismic nodes in the seismic node storage system. The seismic nodes may also be connected to the master clock or the measuring device when the seismic nodes are in their docking position in a seismic node storage system. In the seismic node storage system, the seismic nodes may be docked and connected to the master clock or the measuring device, a central computer or a data management system over a long time, and even as long as the nodes are in their docking position. The number of clock drift measurements performed before and after the seismic nodes have been on the seabed are thus not limited to shortly before deployment and shortly after retrieving of the seismic nodes and nor limited as to the number of measurements performed or the period over which the measurements are done.

An improved fit of the clock drift measurements to the $2^{nd}$ order polynomial, and thus improved accuracy for the clock drift correction function, is obtained by increasing the number of clock drift measurements performed before recording and after recording by the seismic nodes. Measuring the clock drift before disconnecting the seismic nodes from the master clock or measuring device and after connecting again the seismic nodes to the master clock or measuring device, and fitting these clock drift measurements to a $2^{nd}$ order polynomial, reduces the possible maximum timing error of the timing reference of the recorded data. This results in increased accuracy and quality of the seismic survey data obtained with the seismic node and thus an improved resolution of the underground. Such an improved clock drift correcting function may also allow for use of less expensive slave clocks in the seismic nodes with better timing accuracy compared to use of prior art linear correction methods.

BRIEF DESCRIPTION OF DRAWINGS

Example embodiments of the invention will now be described with reference to the followings drawings, where.

DETAILED DESCRIPTION

Figure 1:
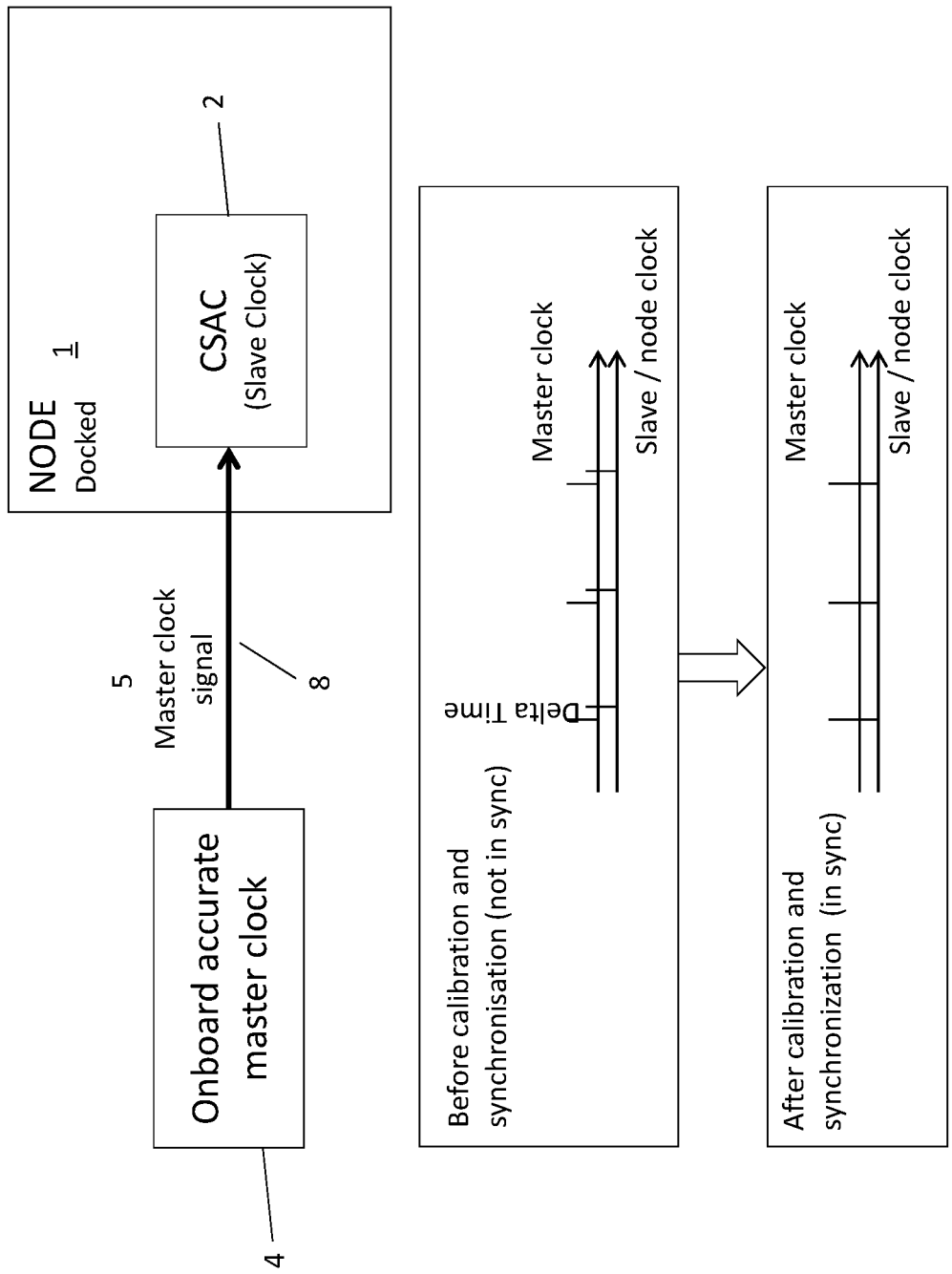
FIG. 1 illustrates calibration and synchronisation of a seismic node slave clock to a master clock.

Example embodiments are described with reference to the drawings. The same reference numerals are used for the same or similar features in all the drawings and throughout the description.

Figure 2A:
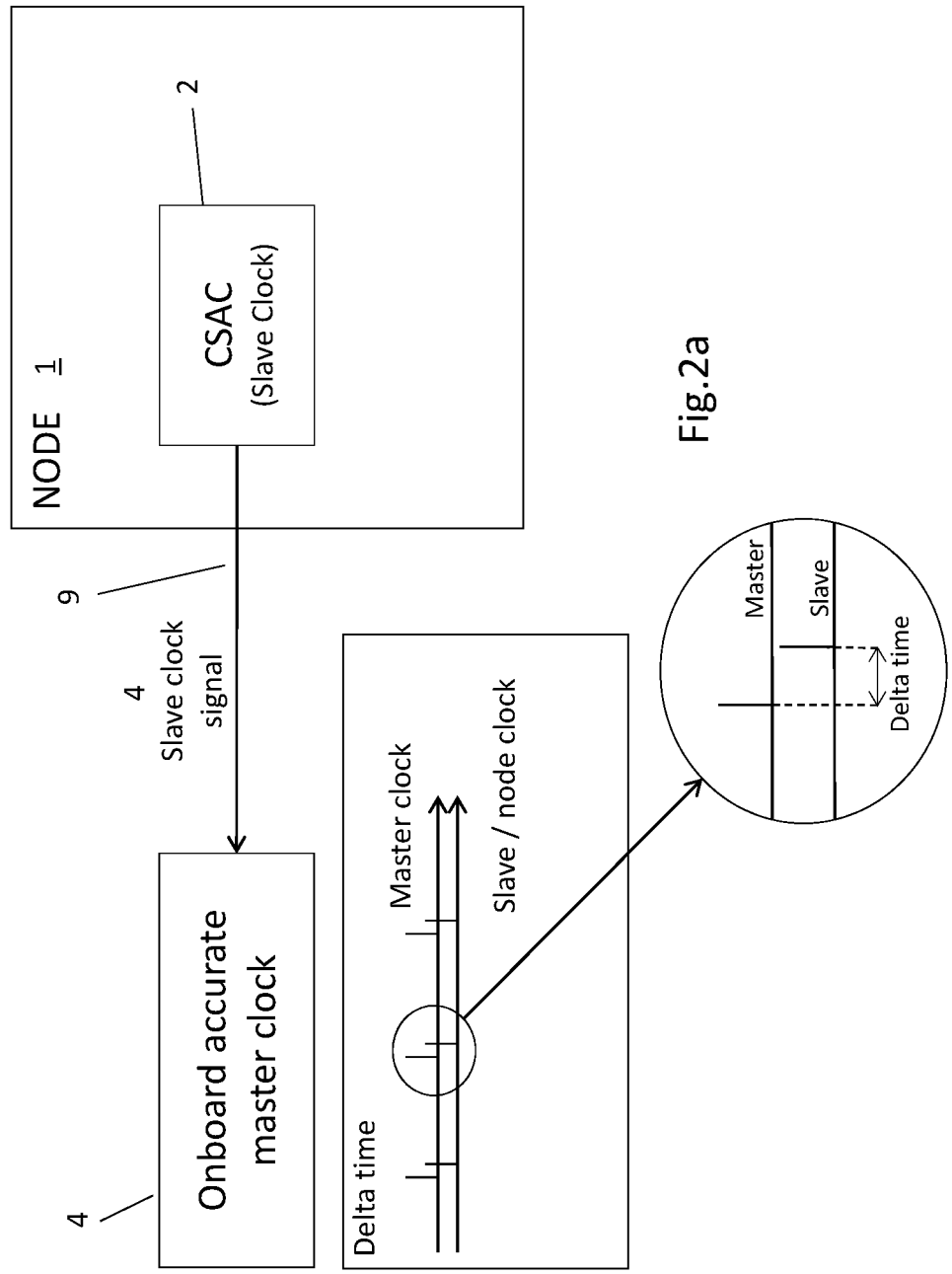
FIGS. 2a, 2b illustrates a clock drift measurement of a seismic node slave clock on retrieval of the seismic node.
Figure 2B:
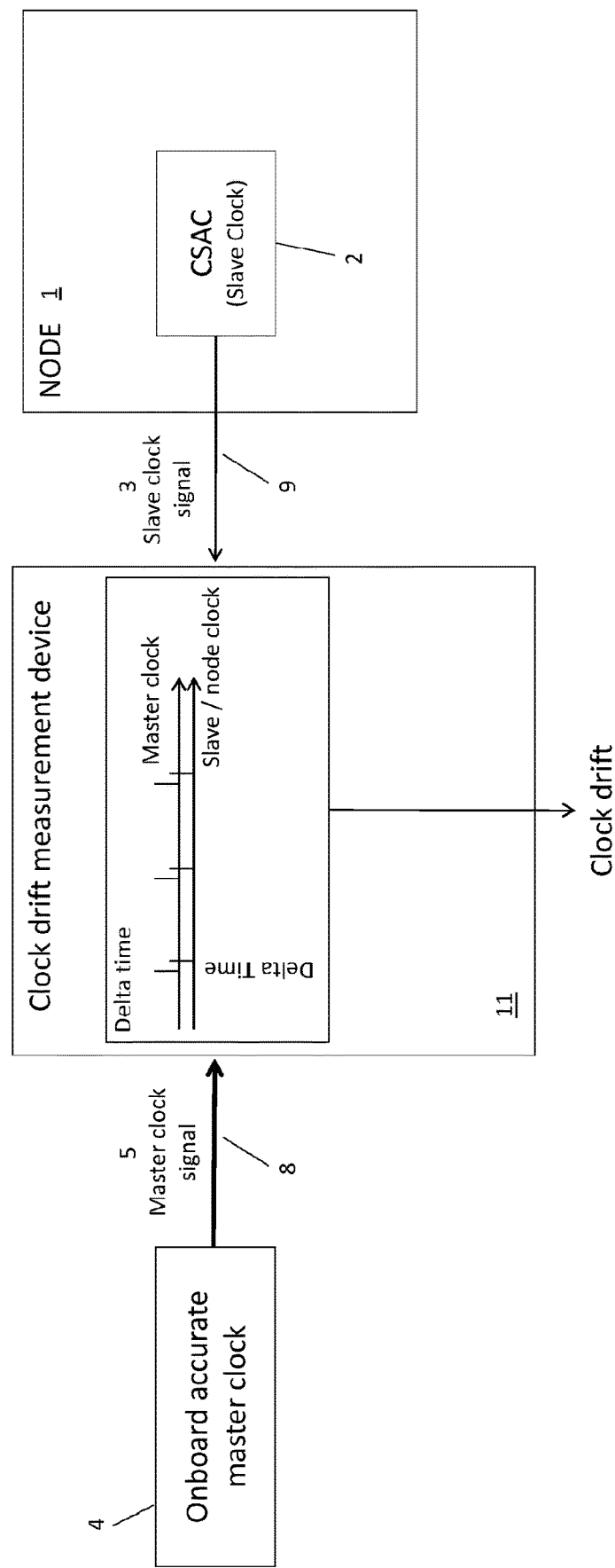
Figure 3:
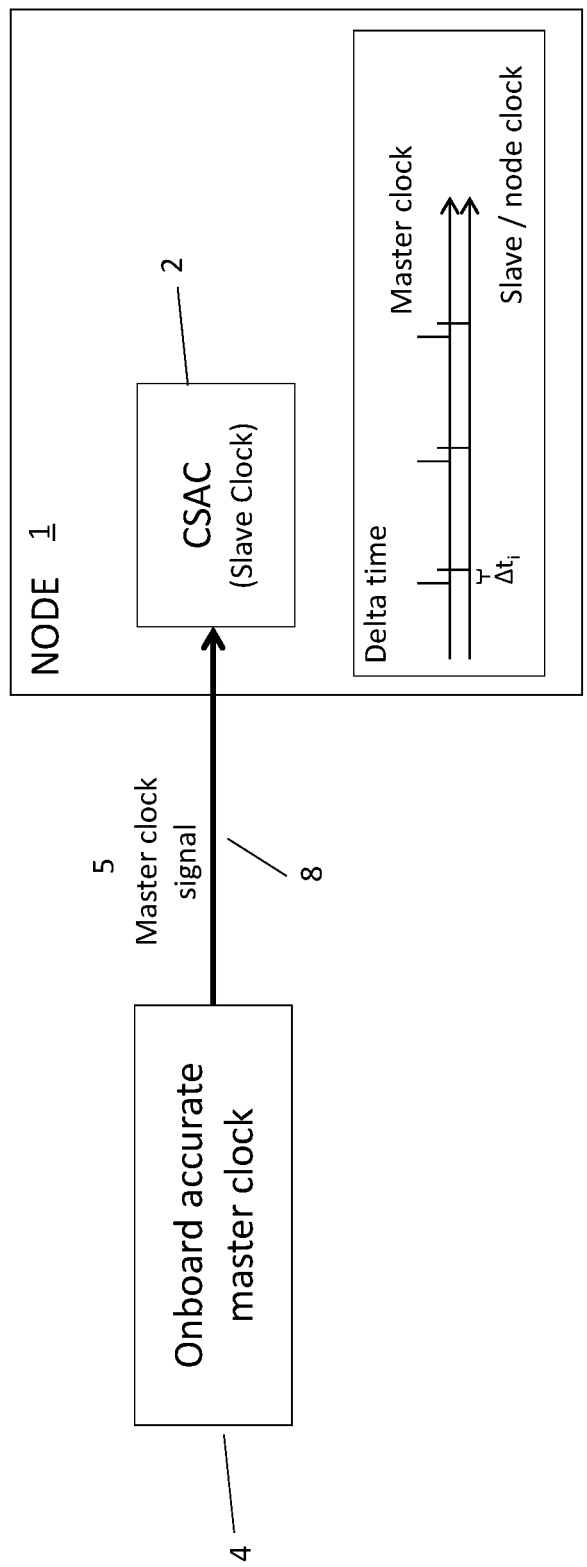
FIG. 3 illustrates a clock drift measurement of a seismic node slave clock on retrieval where the clock drift measurement is performed in the seismic node itself.

FIGS. 2a, 2b and FIG. 3 illustrate possible example embodiments for measuring clock drift, $\Delta t_i$, in a slave clock in a seismic node. The clock drift may be measured for each slave clock in each seismic node both before deployment and after retrieval of the seismic node from the seabed. While on the seabed, the seismic nodes record seismic sensor data resulting in data sets of recorded seismic sensor data as a function of time. As the slave clocks drift as explained earlier, the time of reference of the recorded seismic sensor data by each node is corrected for the clock drift of the seismic node slave clock to achieve recorded seismic sensor data aligned to the true and same time of reference of the master clock for the seismic recording. In order to be able to correct for clock drift of a slave clock in a seismic node, a number of clock drift measurements for the seismic node slave clock are obtained. A clock drift correction function for the seismic node slave clock are calculated by curve fitting the number of obtained clock drift measurements to a $2^{nd}$ order polynomial function. The time of reference of the recorded seismic sensor data by the node, are corrected by the $2^{nd}$ order polynomial clock drift correction function.

At least one clock drift measurement of the seismic node slave clock may be obtained before recording of seismic sensor data by the seismic node. The slave clocks in the seismic nodes are synchronized with a master clock before recording of seismic sensor data by the seismic nodes. The first clock drift measurement may thus be provided by the synchronization of the seismic node slave clock with the master clock. However, two or more clock drift measurements of the seismic node slave clock may be obtained before recording by the seismic node. These two or more clock drift measurements may be provided by the synchronization measurement and additional clock drift measurements. These clock drift measurements may be performed during a first specified time-period. Before recording of seismic sensor data, the seismic node is disconnected from the master clock. After recording of seismic sensor data by the seismic node, the seismic node is again connected to the master clock. At least two clock drift measurements of the seismic node slave clock may be obtaining during a second specified time-period after connecting the seismic node to the master clock.

Figure 7:
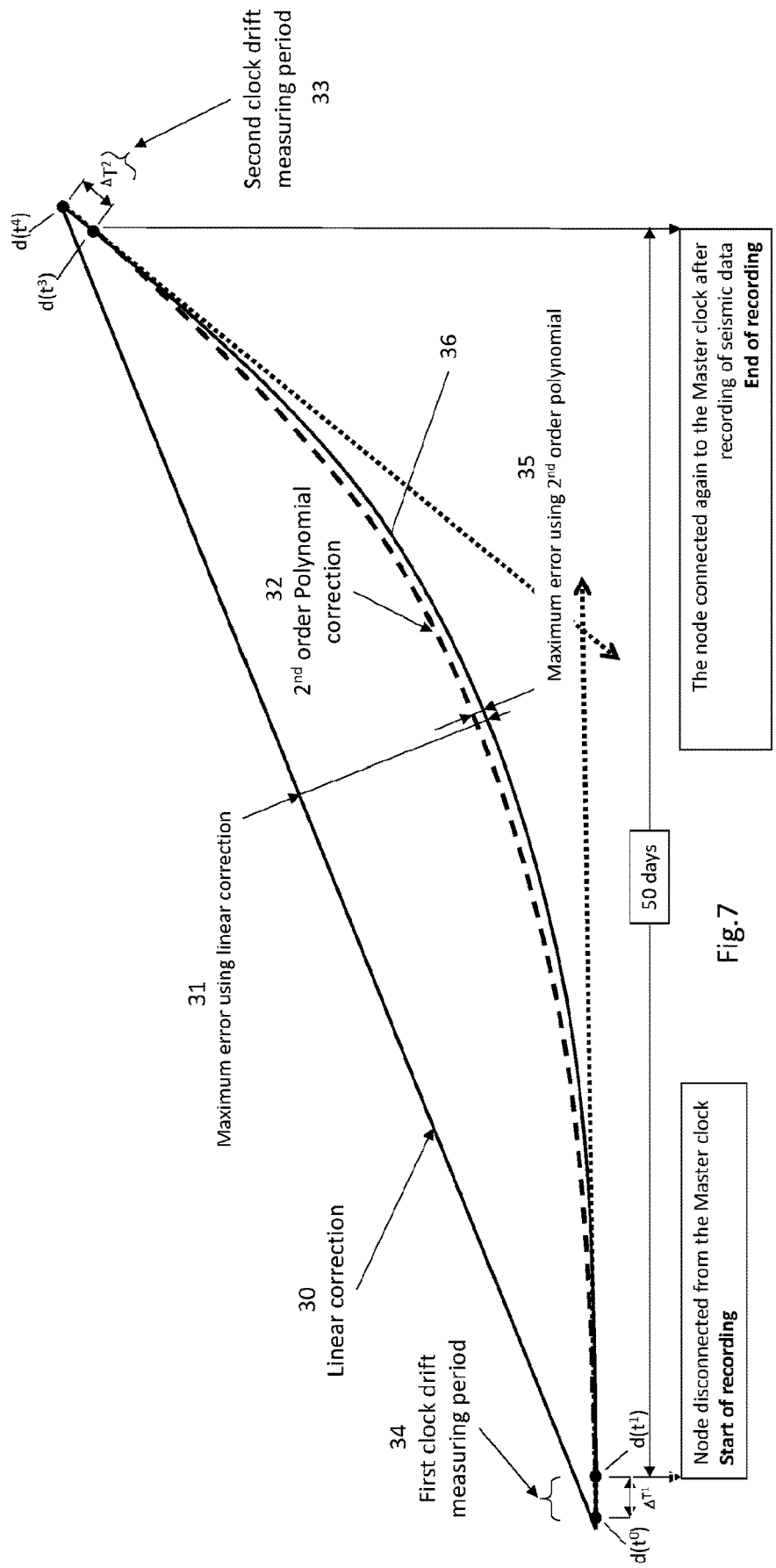
FIG. 7 illustrates a correction function for the clock drift of a slave clock in a seismic node.

Clock drift correction functions for a slave clock in a seismic node are illustrated in FIG. 7. A $2^{nd}$ order polynomial clock drift correction function is shown as the $2^{nd}$ order polynomial curve 32. The prior art linear correction as explained earlier is illustrated as the straight line linear correction 30. As explained earlier, the prior art linear correction function for the clock drift is calculated from two measurements, where the first measurement is the synchronization of the slave clock(s) in each node before deployment and the second measurement is the measurement of the clock drift in the slave clock(s) in each node after retrieval.

The $2^{nd}$ order polynomial function represents a correction function for the clock drift of the at least one slave clock in the at least one seismic node from the time of the first clock drift measurement and to the time of the final clock drift measurement. The time of reference of the recorded seismic sensor data by that node, may then be corrected by the $2^{nd}$ order polynomial correction function 32 for the clock drift of the slave clock in that node for better data quality in seismic processing. The real clock drift is shown as curve 36. As can be seen from the example in FIG. 7, the clock drift correction function 32 (and the prior art linear correction function 31) is always correct in both ends (for $d(t_0)$ and $d(t_4)$) when the clock drift measurements are performed, with typically the largest deviation from the real clock drift in the middle of the recording period.

The time drift d at any time t of a slave clock are expressed as a $2^{nd}$ order polynomial:

$$d(t)=at^1+bt+c \quad \text{(eq. 1)}$$

where a, b and c are coefficients.

The coefficients a, b and c may be determined based on three clock drift measurements. The first clock drift measurement may be the synchronization of the seismic node slave clock with the master clock at t=0. This implies that $d(t)=0=c$ for t=0. The $2^{nd}$ order polynomial 32 may thus be calculated with only one measurement ($t_0$) before deployment where $t_0$ may be the time when synchronization or a separate measurement takes place.

In the example below the coefficients a, b and c are determined based on four clock drift measurements in addition to the synchronization the seismic node slave clock with the master clock. The calculation of the coefficients a and b are based on eq.3 and eq.4 below as for the example with four clock drift measurements, however with only three measurements $d(t_0)$ and $d(t_1)$ are zero.

Determination of the coefficients a, b and c based on four clock drift measurements. These four clock drift measurements are:

$$d(t_0),d(t_1),d(t_2),d(t_3)$$

The first clock drift measurement $d(t_0)$, and the second clock drift measurement $d(t_1)$, are performed before disconnecting the seismic node slave clock from the master clock before recording of seismic sensor data.

The first clock drift measurement, $d(t_0)$, may be performed after synchronization of the slave clock. The first clock drift measurement is performed for $t_0=0$. The synchronization of the slave clock takes place at t<0. Synchronization may be performed just before the first clock drift measurement, but may also take place well before t=0, e.g. at t=−1000 s or earlier. Earlier may be minutes, hours or days. Tests show that good accuracy of the $2^{nd}$ order correction function are achieved with synchronization 2-3 days and 20 days before the first clock drift measurement. The first clock drift measurement, $d(t_0)$ may also be the synchronization of the seismic node slave clock with the master clock.

The second clock drift measurement $d(t_1)$ is performed after the first clock drift measurement at t>0. After the second clock drift measurement, the seismic node may be disconnected from the master clock. The seismic node may then be deployed to the seabed for seismic surveying. The seismic nodes in a seismic survey may be deployed for a various amount of time before retrieval from the seabed. In the example in FIG. 7, the seismic nodes have been recording for 50 days on the seabed before retrieval (as an example). After retrieval, the seismic nodes are connected to the master clock or a measuring device. After connecting to the master clock or measuring device, the third clock drift measurement, $d(t_2)$, is performed. The fourth clock drift measurement, $d(t_3)$, is performed after the third clock drift measurement. The third clock drift measurement, $d(t_2)$, and the fourth clock drift measurement, $d(t_3)$, are performed during a time period.

The coefficient c in the $2^{nd}$ order polynomial is calculated as follows:

$$C=d(t_0) \quad \text{(eq.2)}$$

The coefficient a, is found using the double derivate of the $2^{nd}$ order polynomial function. (eq.3)

$$a = \frac{1}{2} \frac{\frac{d(t_3)-d(t_2)}{t_3-t_2} - \frac{d(t_1)-d(t_0)}{t_1-t_0}}{t_3-t_0}$$

The coefficient b is found by substitution (eq.4)

$$b = \frac{(d(t_3)-d(t_0))-a(t_3-t_0)^2}{t_3-t_0}$$

The interval between the first clock drift measurement and the second clock drift measurement may typically be 10 minutes. However, the time periods may also be shorter or longer. An interval of about 10 minutes has been demonstrated to provide a stable solution for a Chip Scale Atomic Clock (CSAC) and a good estimate for the $2^{nd}$ order correction function for the clock drift as compared with the true clock drift for a slave clock. The accuracy of the clock drift measurement itself is about 11 ns with today's technical solutions. By stable solution means a measurement situation with less chances of calculating an inaccurate slope of the $2^{nd}$ order polynomial curve. An inaccurate slope will lead to larger uncertainties in the determination of the coefficient a. A longer time interval between the measurements than 10 minutes may further improve the accuracy of the estimated clock drift as compared to the true clock drift for the slave clock.

The accuracy of the correction function is improved for large time differences between the last clock drift measurement $d(t_3)$ and the first clock drift measurement $d(t_0)$. The improved accuracy also depends on the aging of the crystal in the slave clock. The accuracy as compared with a prior art linear solution, may be improved by 2 to about 1000 times or more. A maximum error over a 100 day period using the Chip Scale Atomic Clock may be reduced to +/−50 to 100 micro second compared to +/−1000 micro second with a linear correction.

More than four time-drift measurements may also be performed. Increasing the number of measurements will increase the accuracy of the $2^{nd}$ order curve fit and hence the clock drift correction function. The difference between consecutive clock drift measurements in the first time period may be averaged to improve the accuracy of the difference $d(t_1)-d(t_0)$. Likewise, the difference between consecutive clock drift measurements in the second time period may be averaged to improve the accuracy of the difference $d(t_4)-d(t_3)$.

Using an average of the clock drift measurements to improve the result, will have the same effect as increasing the time between $t_1$ and $t_0$ and also between $t_3$ and $t_2$. As an example, 10 clockdrift measurements may be performed during the first time interval (before disconnecting from the master clock). Each of these 10 measurements may also be executed at an interval of about 10 minutes. The first clock drift measurement is then made at t=0, the second at t=10 minutes, the third at t=20 minutes etc. Two clock drift measurements may be performed during the second time interval (after again connecting to the master clock), also with an interval of about 10 minutes between each measurement. This may further improve the accuracy of the estimated clock drift function. Other alternatives further improving the accuracy may be possible such as two clock drift measurements during the first time interval, and then a number of clock drift measurements (e.g. 5, 10 or more) during the second time interval. Also e.g. 5, 10 or more clock drift measurements during the first time interval and the second time interval may also be possible. It may also be envisaged that clock drift may be measured as long as the node is connected to the master clock, both during the first time interval (before disconnecting from the master clock) or during the second time interval (after again connecting to the master clock). Clock drift of the slave clock may be measured intermittently or nearly continuously depending on the master clock signal. The interval and number of clock drift measurements performed to ensure a clock drift correction function with acceptable accuracy may also depend on type of clock oscillator.

A possible example procedure for measuring the clock drift of the slave clock in the seismic node may be as follows:

The seismic nodes are connected to the master clock or measurement device. At t<0 the slave clocks are synchronized to the master clock. At t=0 the measurements of clock drift are initiated. The clock drift measurements may be performed a number of times or as long as the node is connected to the master clock or measurement device. It is also possible to use the synchronization to the master clock as the only clock drift measurement before deployment of the seismic nodes onto the seabed. The seismic nodes are disconnected from the master clock or measurement device and deployed onto the seabed. After recording on the seabed, the seismic nodes are retrieved. Onboard the vessel, the seismic nodes are again connected to the master clock or measurement device and clock drift measurements performed. The clock drift measurements may be transmitted to the data management system (DMS) or the central computer onboard the vessel or stored in a memory of the seismic node or seismic node slave clock.

The clock drift measurements may be obtained when the seismic node is in a storage position or docking position in a seismic node storage system. The final storage positions may be in a node storage system having a node storage area(s), a node storage rack(s) or node storage shelf/shelves. The clock drift measurements may be obtained when the seismic node is not in a storage position in the seismic node storage system. The clock drift measurements may be obtained when the node is e.g. in synchronization position or preparation station before deployment, in an intermediate measurement position before or after deployment, a readout station after deployment or other positions in the seismic node handling system.

The connection to the master clock or measurement device may be a cable based connection or a wireless connection.

The clock drift measurements may be obtained in the at least one seismic node. The master clock signal is received in each seismic node, and clock drift measurements between a slave clock signal and the received master clock signal obtained. The clock drift correction function may also be calculated in the seismic node. The clock drift measurements and or the calculation of the clock drift correction function may be performed by the at least one slave clock in the seismic node, in a processor in the seismic node or in a hardware and/or software component in the seismic node. The clock drift measurement may also be obtained by a clock drift measuring device outside the node. The clock drift correction function may be calculated by the clock drift measuring device or in e.g. a central computer of the seismic node handling system.

The time of reference of the recorded seismic sensor data are corrected by the $2^{nd}$ order polynomial clock drift correction function. The time of reference of the recorded seismic sensor data in the seismic node may be corrected before or during downloading of the recorded seismic sensor data from the seismic node and to a central computer. The recorded seismic sensor data may be transmitted from the at least one seismic node and to a central computer over a cable, a fibre optic cable or a wireless transmission, where the wireless transmission comprising at least one of optical transmission, radio broadcasting transmission, or RF transmission. The recorded seismic sensor data may be corrected for clock drift by use of the $2^{nd}$ order clock drift function before transmittal or transmitted in uncorrected form. The recorded seismic sensor data may be corrected for clock drift in the central computer or later corrected for clock drift in other external computing facilities.

When the clock drift measurements are obtained when the nodes are in the storage position, this may allow the nodes to be connected to a clock drift measurement system as long as the nodes are docked. Such a solution opens up for the possibility of performing a large number of clock drift measurements further improving the accuracy of the clock drift correction function achieved through the curve fit of these measurements to the $2^{nd}$ order polynomial.

The seismic nodes may typically also include sensors, internal memory, processors and batteries as required for operation as a seismic node on the seabed. The sensors may e.g. include at least one of geophones, hydrophones, recorders, compasses, tilt sensors and transponders. The batteries may be non-rechargeable or rechargeable. If rechargeable batteries are used, a built in battery charger may also be included. The seismic node and seismic node handling system also include software and/or firmware for executing the procedures performed by and in the nodes and by and in the seismic node handling system.

A communication line for the master clock signal, a communication line for the clock drift signal and any communication lines between the seismic nodes and a seismic node handling system may be a cable based communication line, a fibre optic based communication line or a wireless transmission. The cable connection may be a single line, an electrical cable, or a fibre optic cable. The wireless transmission may e.g. be optical transmission, radio broadcasting transmission, or RF transmission. The charging of batteries and any power transfer may be a cable based solution or a wireless solution. Wireless power transfer includes e.g. induction.

Some example embodiments implementing the method above are provided below.

FIG. 1 illustrates calibration and synchronization of an internal seismic node slave clock 2. A vessel master clock 4 transmits a master clock synchronization signal 5 to the seismic node 1. The vessel master clock is a highly accurate precision clock. The precision clock may e.g. be an atomic clock or a high precision oscillator that may be calibrated and synchronized with satellite systems (e.g. GPS). The slave clock 2 in FIG. 1 might be a Chip Scale Atomic Clock (CSAC) or another precision clock. Calibration of the internal seismic node slave clock 2 may be performed internally in the seismic node 1 or in the slave clock 2 itself. Any deviations, clock drift, $\Delta t_i$, and accuracy, (before calibration) between the time synchronization signal or pulses 5 of the master clock and the time synchronization signal or pulses of the seismic node slave clock 2, are aligned during the calibration and synchronization procedure. The slave clock 2 in the seismic node 1 will then, after the calibration procedure, be calibrated and synchronized with the master clock 4. As illustrated in FIG. 1, after calibration and synchronization the seismic node slave clock time synchronization pulses are aligned with the master clock time synchronization pulses 5; i.e. the master clock time synchronization pulses are in sync with seismic node slave clock time synchronization pulses. The seismic nodes 1 are hence deployed with slave clocks 2 that are close to calibrated and synchronized with the master clock 4 on the vessel. Each of the seismic nodes 1 may be connected directly or indirectly to the vessel master clock 4 for calibration and synchronization just before deployment of the seismic nodes. Each of the seismic nodes 1 may again on retrieval from the sea be connected to the vessel master clock to measure the clock drift $\Delta t i$.

Example embodiments of procedures for measuring clock drift $\Delta t_i$ are illustrated in FIGS. 2a and 2b.

The seismic nodes 1 are connected to the vessel master clock 4 before deployment onto the seabed and after retrieval when the seismic nodes are onboard the vessel. The seismic node's internal slave clock 2 sends its internal slave clock synchronization signal 3 to the vessel master clock 4. The vessel master clock 4 compares the slave clock synchronization signal 3 with its own master clock synchronization signal and provides a measurement of the time difference, $\Delta t_i$ called clock drift. The internal slave clock synchronization signal 3 and the master clock synchronization signal 5 may also both be sent to a separate clock drift measuring device 11 (FIG. 2b) comparing the slave clock synchronization signal 3 with the master clock synchronization signal 5. When the clock drift of the slave clock in the connected seismic node 1 has been measured by the vessel master clock 4 (FIG. 2a), the master clock is disconnected from the connected seismic node to allow the next seismic node(s) to be connected. When the clock drift has been measured by the clock drift measuring device 11 (as in the alternative in FIG. 2b), the connected seismic node is disconnected from the measuring device to allow the next seismic node(s) to be connected.

FIG. 3 illustrates a clock drift measurement of an internal seismic node slave clock 2 where the clock drift measurement is performed internally in the seismic node 1. The measurement of clock drift, $(\Delta t_i,)$ is performed when the seismic node 1 is connected to the master clock 4. The slave clock in FIG. 3 is a Chip Scale Atomic Clock (CSAC), but other precision clocks may be used. The seismic node 1 receives the master clock signal 5 from the master clock 4, and obtains the clock drift $(\Delta t_i)$ between the slave clock signal and the signal from the master clock. The master clock signal may be a synchronization signal having accurate synchronization pulses e.g. a pulse at intervals of one second, but other pulse shapes and pulse intervals may also be used. The synchronization signal from the master clock may also be other forms of synchronization pulses or signals.

Figure 4:
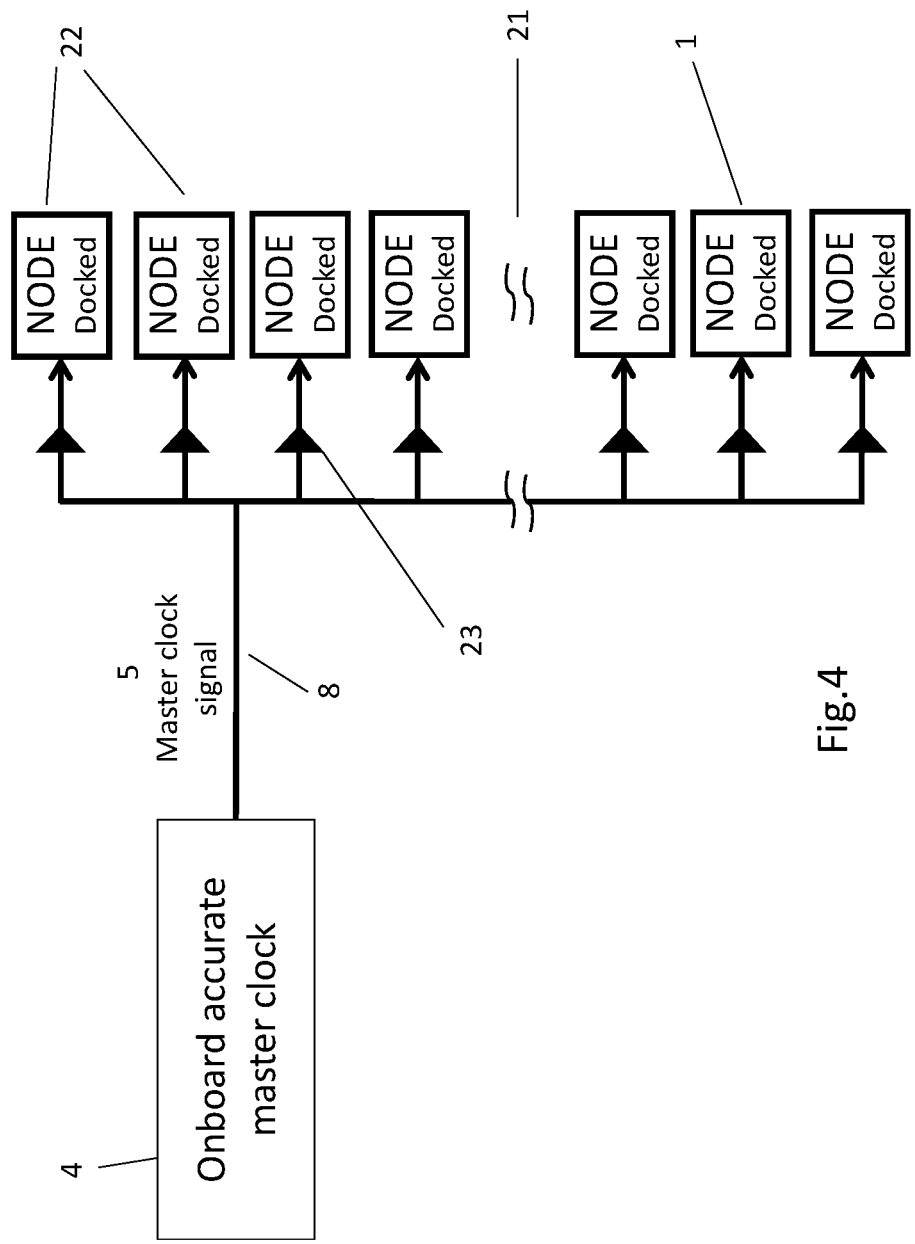
FIG. 4 illustrates clock drift measurement of seismic nodes in a node storage system where the clock drift measurement is performed in the seismic nodes.

The example embodiment in FIG. 4 illustrates a number of seismic nodes 1 docked in their final docking positions 22 in the storage system 21 and connected to the master clock 4. The synchronization of the slave clock to the master clock and the measurement of clock drift between the slave clock and the master clock before disconnecting the nodes from the master clock, are performed when the nodes are in their docking position. The nodes are disconnected from the master clock before deployment onto the seabed. After retrieval of the seismic nodes from the seabed, the seismic nodes are again connected to the master clock upon docking. All the seismic nodes may be simultaneously connected and/or remain to be connected at the same time to the master clock. The measurement of the clock drift in the seismic nodes is as explained above in FIG. 3. A driver or repeater 23 may be used to accomplish connection of the master clock 4 to all the seismic nodes. The driver or repeater ensures that the master clock synchronization signal is preserved during transmission from the master clock to the seismic nodes to enable accurate clock drift measurements in all the seismic nodes. A driver or repeater 23 may be assigned to each storage position or a group of storage positions. Use of a driver or repeater is preferred when the master clock synchronization signal is in the form of accurate synchronization pulses. Use of a driver or repeater is also preferred for a system with a large number of seismic nodes.

Figure 5A:
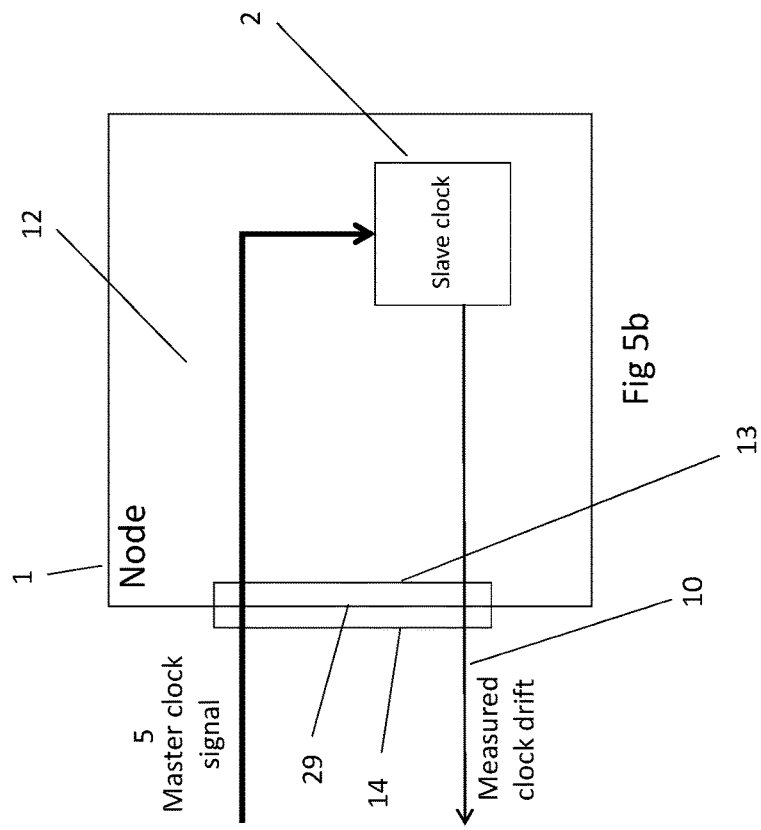
FIGS. 5a and 5b illustrates a seismic node configured for performing the clock drift measurement in the seismic node.
Figure 5B:
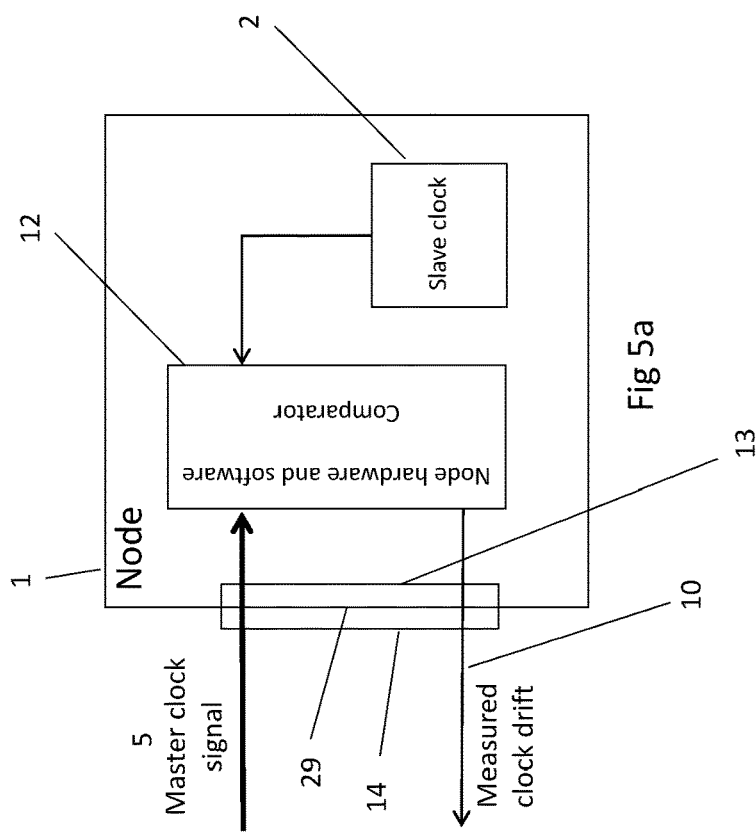

FIGS. 5a and 5b illustrates further example embodiments of a seismic node 1. The seismic node in both FIGS. 5a and 5b is configured for internal clock drift measurements; i.e. the measurement of clock drift is performed internally in the seismic node itself. The seismic node comprises a slave clock 2 and an input for receiving the synchronization signal from the master clock.

In the embodiments in FIG. 5a and FIG. 5b, the seismic node comprises a signal comparator 12. The signal comparator 12 is used for obtaining the time difference, and hence the clock drift, between the slave clock 2 and the received signal from the master clock 4. The clock signal comparator 12 may be software and/or hardware. The clock signal comparator may be arranged as a separate component in the node as illustrated in FIG. 5a. The clock signal comparator 15 may alternatively be included in the slave clock 2 itself as illustrated in FIG. 5b. The comparator may be hardware and/or software to be run by a node processor.

The input for receiving the signal from the master clock may be provided in a seismic node connector 13 used for connecting the seismic node to the master clock. The seismic node may be connected to the master clock in a storage position. The storage position may be a docking station. The storage position/docking stations comprises a corresponding docking connector 14 for connecting to the seismic node connector 13. The seismic node connector and the docking connector may be provided with plugs or connecting devices for at least one of electrical connection, connectors for optical fibres or wireless communication. The seismic node connector may be designed as a common single node interface 29 with the docking connector 14. This common single node interface 29 may thus be the common interface with the seismic node handling system 20 onboard the vessel. The seismic node interface 29 may thus also provide an interface for e.g. the synchronization and calibration signals received from the master clock before deployment of the seismic nodes, for the signals received from the master clock after recovery of the seismic node, for data communication between a data management system and the seismic node, for transmission of the measured clock drift, and for power and charging of the chargeable batteries in the nodes.

The seismic node may include a transceiver/transmitter for transmitting the measured clock drift $(\Delta t_i)$ to the data management system 25 or a central computer 26. The clock drift may be also be transmitted by the separate comparator device 15 (FIG. 5*a*) or by the slave clock 3 (FIG. 5*b*). The measured clock drift may be transmitted to a central computer via a cable, fibre optic cable or wirelessly.

Figure 6:
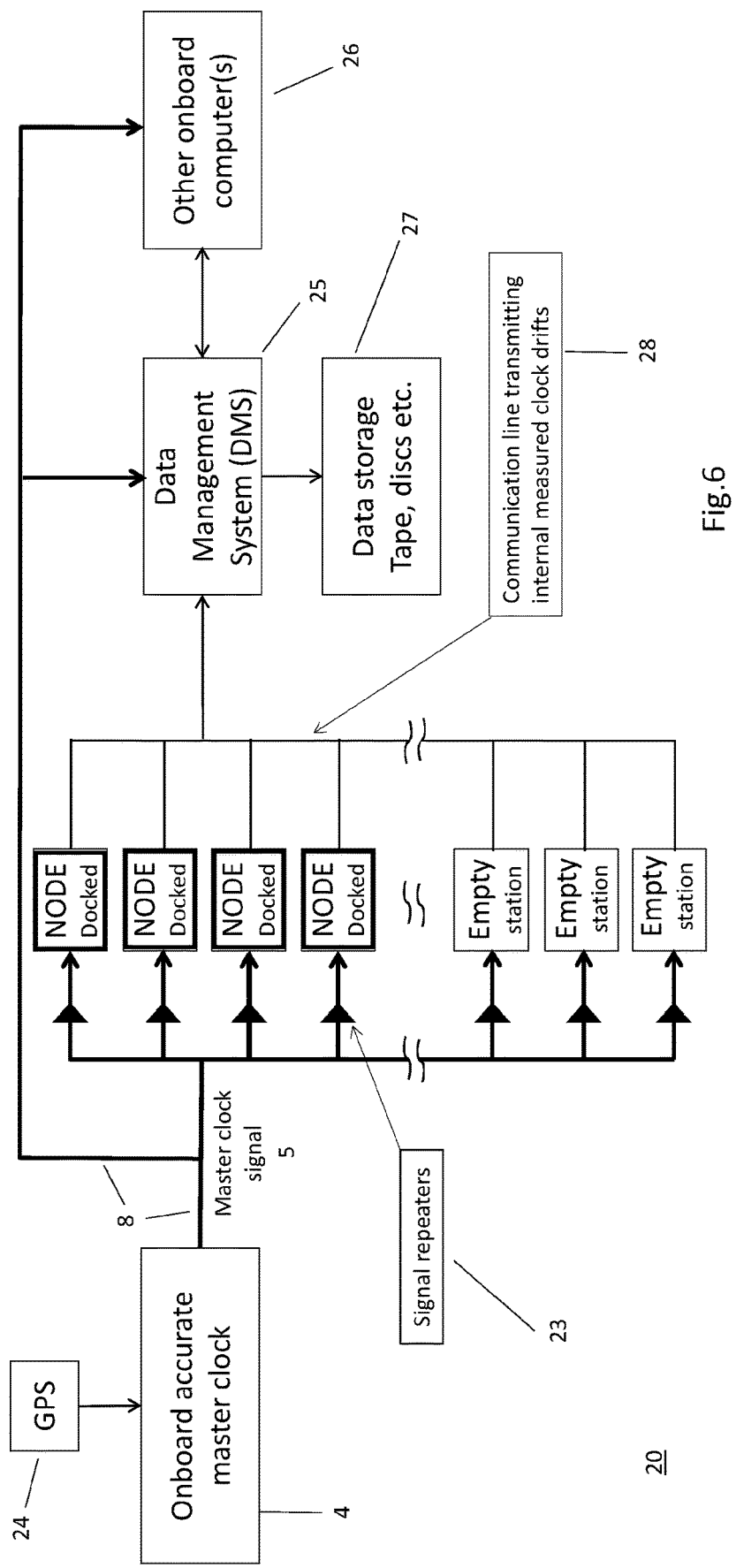
FIG. 6 illustrates a seismic node handling system configured for performing the clock drift measurement in the seismic nodes.

An example embodiment of a seismic node handling system 20 for clock drift measurement internally in the seismic nodes, is illustrated in FIG. 6. The seismic node handling system comprises a master clock 4, and a clock drift between a clock 2 in a seismic node 1 and the master clock is obtained by a clock drift measurement internally in each seismic node as explained above. The seismic node handling system 20 comprises a seismic node storage system 21 comprising a plurality of storage positions 22 for seismic nodes 1. Each storage position 22 is adapted for receiving a seismic node. In FIG. 6 the storage positions where no seismic node has been docked, are shown as an empty station, and the storage positions where a seismic node has been docked are shown as node docked positions. When the seismic nodes are docked, the docking connector assigned to the particular storage position is connected to the seismic node connector. As the seismic nodes 1 come onboard the vessel, the seismic nodes are connected to the master clock 4. The seismic node may also upon docking be connected to at least one of the power, data and communication lines of the node handling system. Docking of the seismic nodes in the storage positions may be performed manually, semi-automatic or automatic by e.g. a robotic system. The master clock may be calibrated and synchronized with satellite systems (e.g. GPS 24) or be a high precision atomic clock as explained earlier. The node handling system 20 in the embodiment in FIG. 6 comprises a specially assigned communication line 8 for transmitting the master clock signal 5 from the master clock 4 and to each seismic node docking position 22 in the seismic node storage system. In the embodiment in FIG. 6, a driver or repeater 23 is provided for each seismic node storage position. However, as explained above, use of a driver or repeater 23 is optional, and if used a driver or repeater need not be assigned to each storage position, but may be assigned to a group of storage positions. The measured clock drift in each node slave clock 2 may be transmitted from each seismic node 1 and to the central computer 26 through the data communication line 28. This eliminate the need for a separate transmission line for transmitting the slave clock synchronization signal to the master clock.

As each node receives the master clock synchronization signal 5 when docked or connected, the clock drift can be measured as soon as the node is connected or docked upon retrieval. The master clock signal is the same signal as used for calibration and synchronization of the slave clocks in the nodes before deployment.

The measurement of the slave clock drift between the slave clock signal and the master clock signal is performed in the nodes themselves by software and/or hardware in each node. Each node 1 transmits the measured time-drift via the data communication line or a separate clock drift communication line 10 to the data management system (DMS) 25 or the central computer 26 onboard the vessel.

The recorded data in each node are corrected for clock drift. As the measurement of the clock drift is performed in the seismic node, the correction of recorded data may be performed in each node before or during downloading of the recorded data from the node to a central computer. Alternatively, the correction of recorded data may also be performed after the recorded data has been downloaded from the seismic node to the central computer. The recorded data are stored in data storage mediums 27, e.g. tapes, or discs or other machine readable medium.

Having described embodiments of the invention it will be apparent to those skilled in the art that other embodiments incorporating the concepts may be used. These and other examples of the invention illustrated above are intended by way of example only and the actual scope of the invention is to be determined from the following claims.

The invention claimed is:

1. A method for correcting for clock drift of at least one slave clock in at least one seismic node after a seismic recording by the at least one seismic node on a seabed resulting in data sets of recorded seismic sensor data as a function of time, the method comprising:

obtaining at least one clock drift measurement of the at least one slave clock before deployment of the at least one seismic node into the sea;

obtaining at least two clock drift measurements of the at least one slave clock after recovery of the at least one seismic node from the seabed; and calculating a clock drift correction function of the at least one seismic node slave clock by curve fitting, to a $2^{nd}$ order polynomial, (i) the at least one clock drift measurement obtained before the deployment and (ii) the at least two clock drift measurements obtained after the recovery.

2. The method according to claim 1, wherein the obtaining the at least one clock drift measurement includes obtaining a second clock drift measurement of the at least one slave clock before the deployment of the at least one seismic node into the sea.

3. The method according to claim 2, wherein the obtaining the at least one clock drift measurement includes synchronizing the at least one slave clock with a master clock.

4. The method according to claim 2, wherein the obtaining the at least one clock drift measurement includes obtaining a first set of clock drift measurements of the at least one slave clock during a first time-period.

5. The method according to claim 1, wherein the obtaining the at least two clock drift measurements includes obtaining a second set of clock drift measurements of the at least one slave clock during a time-period after the recovery of the at least one seismic node from the seabed.

6. The method according to claim 1, wherein the at least one clock drift measurement and the at least two clock drift measurements are obtained when the at least one seismic node is in a storage position in a seismic node storage system.

7. The method according to claim 1, wherein the at least one clock drift measurement and the at least two clock drift measurements are obtained when the at least one seismic node is in an intermediate measurement position in a seismic node handling system.

8. The method according to claim 1, further comprising correcting a time of reference of the recorded seismic sensor data by the $2^{nd}$ order polynomial clock drift correction function.

9. The method according to claim 1, further comprising correcting the time of reference of the recorded seismic sensor data in the at least one seismic node before or during downloading of the recorded seismic sensor data from the at least one seismic node and to a central computer.

10. The method according to claim 1, wherein the method is performed in the at least one seismic node.

11. The method according to claim 1, wherein the method is performed by a clock drift measuring device.

12. A seismic node adapted for performing a seismic recording on a seabed resulting in data sets of records seismic sensor data as a function of time, the seismic node comprising:

a slave clock; and a processor configured to obtain at least one clock drift measurement of the slave clock before deployment of the seismic node into the sea, obtaining at least two clock drift measurements of the slave clock after recovery of the seismic node from the seabed, and calculating a clock drift correction function of the seismic node slave clock by curve fitting, to a $2^{nd}$ order polynomial, (i) the at least one clock drift measurement obtained before the deployment and (ii) the at least two clock drift measurements obtained after the recovery.

13. The seismic node according to claim 12, wherein the processor is further configured for receiving a master clock signal and obtaining a clock drift between the slave clock and the master clock signal.

14. A handling system for at least one seismic node adapted for performing a seismic recording on a seabed resulting in data sets of recorded seismic sensor data as a function of time, wherein the at least one seismic node comprises at least one slave clock the handling system comprising:

a master clock; and a processor configured to obtain at least one clock drift measurement of the at least one slave clock before deployment of the at least one seismic node into the sea;

obtain at least two clock drift measurements of the at least one slave clock after recovery of the at least one seismic node from the seabed; and calculating a clock drift correction function of the at least one seismic node slave clock by curve fitting, to a $2^{nd}$ order polynomial, (i) the at least one clock drift measurement obtained before the deployment and (ii) the at least two clock drift measurements obtained after the recovery.

15. The handling system for seismic nodes according to claim 14, wherein a clock drift between a slave clock in a seismic node and the master clock is obtained by a clock drift measurement internally in each seismic node.

16. A non-transitory computer-readable medium having a computer program stored thereon, which when executed by a processor, cause the processor to perform:

obtaining at least one clock drift measurement of the at least one slave clock before deployment of the at least one seismic node into the sea;

obtaining at least two clock drift measurements of the at least one slave clock after recovery of the at least one seismic node from the seabed; and calculating a clock drift correction function of the at least one seismic node slave clock by curve fitting, to a $2^{nd}$ order polynomial, (i) the at least one clock drift measurement obtained before the deployment and (ii) the at least two clock drift measurements obtained after the recovery.

* * * * *